United States Patent
Yi

(10) Patent No.: US 11,545,071 B2
(45) Date of Patent: Jan. 3, 2023

(54) DISPLAY DEVICE AND CONTROL METHOD THEREOF

(71) Applicant: BOE TECHNOLOGY GROUP CO., LTD., Beijing (CN)

(72) Inventor: Zhusong Yi, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/551,398

(22) Filed: Dec. 15, 2021

(65) Prior Publication Data

US 2022/0319389 A1 Oct. 6, 2022

(30) Foreign Application Priority Data

Mar. 31, 2021 (CN) .......................... 202110352073.7

(51) Int. Cl.
G09G 3/20 (2006.01)

(52) U.S. Cl.
CPC ... *G09G 3/2092* (2013.01); *G09G 2340/0407* (2013.01); *G09G 2354/00* (2013.01); *G09G 2370/04* (2013.01); *G09G 2370/12* (2013.01)

(58) Field of Classification Search
CPC ............................................. G09G 2340/0407
See application file for complete search history.

(56) References Cited

U.S. PATENT DOCUMENTS

| 2008/0239151 A1 | 10/2008 | Tomonaga et al. |
| 2010/0026695 A1 | 2/2010 | Terada et al. |
| 2010/0026885 A1 | 2/2010 | Terada et al. |
| 2010/0027664 A1 | 2/2010 | Sato |
| 2014/0375878 A1* | 12/2014 | Kataoka ............... H04N 7/0125 348/441 |

OTHER PUBLICATIONS

China Patent Office, First Office Action dated Apr. 19, 2022, for corresponding Chinese application 202110352073.7.

* cited by examiner

*Primary Examiner* — Gustavo Polo
(74) *Attorney, Agent, or Firm* — Houtteman Law LLC

(57) ABSTRACT

A display device includes a controller, a display processor, a resolution converter, and a display screen. The controller, in response to first request of setting a current signal source type to a first signal source type which is a type of a signal source for providing display data having a target resolution and a first definition, generates and transmits a first control signal corresponding to the first request. The display processor receives and forwards the first control signal from the controller. The resolution converter converts the initial display data into first display data having a target resolution and a first definition in response to the first control signal, and transmits the first display data to the display processor. The target resolution is greater than the initial resolution. The first definition is greater than a definition of display data obtained by stretching the initial display data and having the target resolution.

16 Claims, 5 Drawing Sheets

DISPLAY DEVICE AND CONTROL METHOD THEREOF

CROSS-REFERENCE TO RELATED APPLICATION

This application claims priority to Chinese Patent Application No. 202110352073.7, filed on Mar. 31, 2021, the contents of which are incorporated herein by reference in the entirety.

TECHNICAL FIELD

The present disclosure relates to the field of display technology, and in particular, to a display device and a control method thereof.

BACKGROUND

With the development of display technology, display devices with a display resolution of 8K (i.e., a resolution of 7680×4320) are increasingly used. However, since 8K image/video sources are scarce, 4K sources are converted to 8K sources to be displayed on an 8K display device. How to convert 4K sources into 8K sources through an 8K display device and display the converted 8K sources is a problem which needs to be solved urgently at present.

SUMMARY

Embodiments of the present disclosure provide a display device and a control method thereof, which can convert 4K sources into 8K sources and play the converted 8K sources.

In one aspect, the embodiments of the present disclosure provide a display device, including: a controller, a display processor, a resolution converter and a display screen. The controller is configured to generate, in response to a first request of setting a current signal source type to a first signal source type, a first control signal corresponding to the first request, and transmit the first control signal, the first signal source type indicating a type of a signal source for providing display data having a target resolution and a first definition. The display processor is coupled to the controller and configured to receive the first control signal from the controller and to forward the first control signal. The resolution converter is coupled to the display processor, and configured to receive initial display data having an initial resolution, receive the first control signal from the display processor, convert the initial display data into first display data having the target resolution and the first definition in response to the first control signal, and transmit the first display data to the display processor, the target resolution being greater than the initial resolution, and the first definition being greater than a second definition that is a definition of display data obtained by performing image stretching on the initial display data and having the target resolution. The display screen is coupled to the display processor and configured to display the display data from the display processor. The display processor is further configured to receive the first display data from the resolution converter, process the first display data, and transmit the first display data subjected to processing to the display screen, and the display screen is configured to receive the first display data from the display processor and display the first display data having the target resolution with the first definition. The controller, the display processor and the resolution converter are embedded in the display device.

In some embodiments, the display processor includes a first communication control interface via which the display processor receives the first control signal from the controller and forwards the first control signal to the resolution converter. The resolution converter includes a second communication control interface coupled to the first communication control interface, the resolution converter receiving the first control signal from the display processor via the second communication control interface.

In some embodiments, the resolution converter includes a first display data output interface via which the resolution converter transmits the first display data to the display processor. The display processor includes a first display data input interface coupled to the first display data output interface, the display processor receiving the first display data from the resolution converter via the first display data input interface.

In some embodiments, the first communication control interface and the first display data input interface are integrated into a high-definition multimedia interface (HDMI).

In some embodiments, the second communication control interface and the first display data output interface are integrated into an HDMI.

In some embodiments, the controller includes an instruction receiving module and an instruction transmitting module. The instruction receiving module is configured to generate a control signal corresponding to at least one request from a user in response to the at least one request and transmit the control signal, the at least one request including the first request. The instruction transmitting module is coupled to the instruction receiving module and the first communication control interface, and configured to receive the control signal from the instruction receiving module and transmit the control signal to the first communication control interface.

In some embodiments, the controller further includes a control signal transmission interface. The instruction transmitting module is coupled to the first communication control interface through the control signal transmission interface.

In some embodiments, the control signal interface is an I2C interface.

In some embodiments, the instruction receiving module includes a memory unit and an infrared processing circuit. The memory unit is configured to store a mapping relationship between a plurality of keys of a remote controller and key values. The infrared processing circuit is configured to receive a signal emitted by the remote controller when a user presses a key of the remote controller, query the mapping relationship in the memory unit according to the received signal to determine a key value of the key pressed by the user; and generate a control signal according to the determined key value.

In some embodiments, the controller is further configured to: acquire the initial display data with the initial resolution, generate, in response to a second request of setting the current signal source type to a second signal source type, a second control signal corresponding to the second request, and transmit the second control signal and the initial display data to the display processor, the second signal source type indicating a type of a signal source for providing display data having the target resolution and the second definition. The display processor is further configured to receive the initial display data from the controller, and perform image stretching on the initial display data to obtain and transmit second display data having the target resolution and the second definition. The display screen is further configured to receive the second display data from the display processor and display the second display data having the target resolution with the second definition.

In some embodiments, the resolution converter is further configured to perform a playback processing on the first display data, and to transmit the first display data subjected to the playback processing to the display processor.

In some embodiments, the controller includes an initial display data output interface via which the controller transmits the initial display data to the display processor. The display processor includes an initial display data input interface coupled to the initial display data output interface, and the display processor receives the initial display data from the controller via the initial display data input interface.

In another aspect, the embodiments of the present disclosure further provide a control method of a display device, the display device including a controller, a display processor, a resolution converter and a display screen, the control method including: generating, by the controller and in response to a first request of setting a current signal source type to a first signal source type, a first control signal corresponding to the first request, and transmitting the first control signal by the controller, the first signal source type indicating a type of a signal source for providing display data having a target resolution and a first definition; receiving the first control signal from the controller and forwarding the first control signal to the resolution converter by the display processor; receiving initial display data having an initial resolution by the resolution converter, converting, by the resolution converter and in response to the first control signal, the initial display data into first display data having the target resolution and the first definition, and transmitting the first display data to the display processor by the resolution converter, the target resolution being greater than the initial resolution, and the first definition being greater than a second definition that is a definition of display data obtained by performing image stretching on the initial display data and having the target resolution; receiving the first display data from the resolution converter, processing the first display data, and transmitting the first display data subjected to processing to the display screen by the display processor; and displaying the first display data with the target resolution and the first definition by the display screen.

In some embodiments, the control method further includes: performing a playback processing on the first display data and transmitting the first display data subjected to the playback processing to the display processor by the resolution converter.

In some embodiments, the control method further includes, in response to the current signal source type being the first signal source type: generating, by the controller and in response to a user's operation on a video playing state, a control signal corresponding to the operation, and transmitting the control signal to the display processor by the controller; transmitting the control signal to the resolution converter by the display processor; and controlling the playing state of the first display data according to the control signal by the resolution converter.

In some embodiments, the control method further includes: acquiring the initial display data with the initial resolution by the controller; generating, by the controller and in response to a second request of setting the current signal source type to a second signal source type, a second control signal corresponding to the second request, and transmitting the second control signal and the initial display data to the display processor by the controller, the second signal source type indicating a type of a signal source for providing display data having the target resolution and the second definition; receiving the initial display data from the controller, and performing image stretching on the initial display data to obtain and transmit the second display data with the target resolution and the second definition by the display processor; and displaying the second display data by the display screen.

In some embodiments, the control method further includes: performing a playback processing on the second display data and transmitting the second display data subjected to the playback processing to the display processor by the resolution converter.

In some embodiments, the control method further includes, in response to the current signal source type being the second signal source type: controlling, by the controller and in response to a user's operation on a video playing state, a playing state of the second display data.

BRIEF DESCRIPTION OF THE DRAWINGS

In order to more clearly illustrate the technical solutions of the present disclosure, the drawings required to be used in some embodiments of the present disclosure will be briefly described below. It is apparent that the drawings as described below are merely drawings according to some embodiments of the present disclosure, and other drawings can be obtained by those skilled in the art according to these drawings. Furthermore, the drawings as described below may be considered as schematic diagrams, and do not limit the actual size of products, the actual flow of methods, the actual timing of signals, and the like according to the embodiments of the present disclosure.

DETAILED DESCRIPTION

Figure 1:
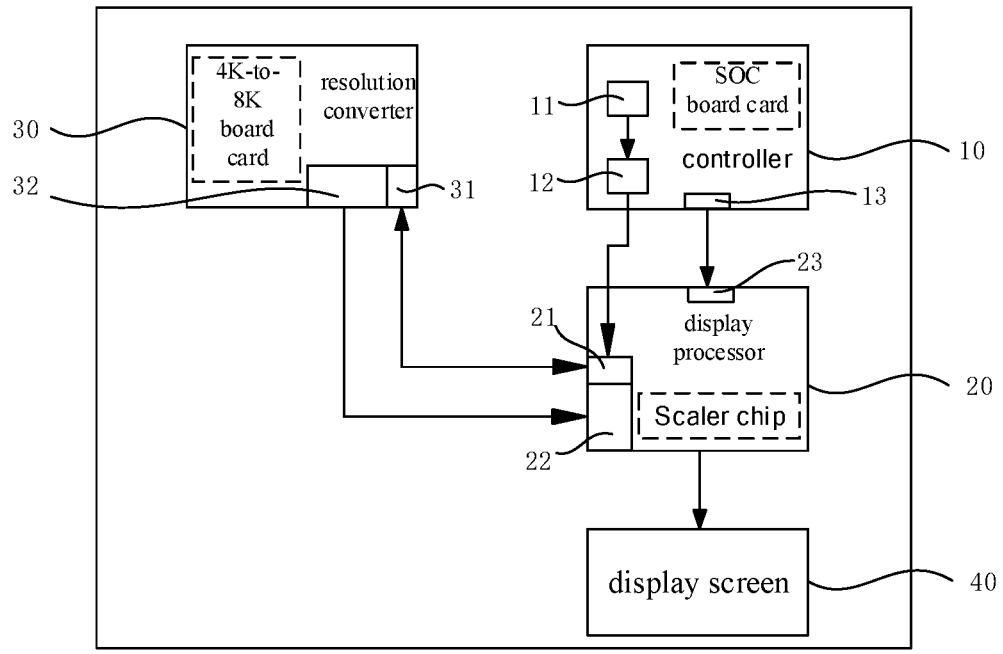
FIG. 1 is a block diagram of a display device according to an embodiment of the present disclosure.

The technical solutions in some embodiments of the present disclosure will be clearly and completely described below with reference to the accompanying drawings, and it is apparent that the described embodiments are only a part of the embodiments of the present disclosure, but not all of the embodiments. All other embodiments obtained by a person of ordinary skill in the art based on the embodiments provided in the present disclosure are within the scope of protection of the present disclosure.

Throughout the specification and claims, the term "comprise" is to be interpreted in an open, inclusive sense, i.e., as "including, but not limited to," unless the context requires otherwise. In the description of the specification, the terms "some embodiments" or "exemplary" and the like are intended to indicate that a particular feature, structure, or characteristic described in connection with the embodiments or examples is included in at least one embodiment or example of the disclosure. The schematic representations of the above terms do not necessarily refer to the same embodiment or example. Furthermore, the particular features, structures, or characteristics may be included in any suitable manner in any one or more embodiments or examples.

In the following, the terms "first", "second", and the like are used for descriptive purposes only and are not to be construed as indicating or implying relative importance or to implicitly indicate the number of technical features indicated. Thus, a feature limited by "first" or "second" may include one or more of that feature explicitly or implicitly. In the description of the embodiments of the present disclosure, "a plurality" means two or more unless otherwise specified.

Herein, "A and/or B" includes the following three combinations: A alone, B alone, and a combination of A and B.

In describing some embodiments, the expressions "coupled" and "connected," along with their derivatives, may be used. For example, the term "connected" may be used in describing some embodiments to indicate that two or more elements are in direct physical or electrical contact with each other. As another example, some embodiments may be described using the term "coupled" to indicate that two or more elements are in direct physical or electrical contact. However, the terms "coupled" or "communicatively coupled" may also mean that two or more elements are not in direct contact with each other, but yet still co-operate or interact with each other. The embodiments disclosed herein are not necessarily limited to the contents herein.

An 8K image/video displayed by an 8K display device includes two types, one is an 8K source produced and processed directly using an 8K camera, and the other is an 8K source into which an image/video source having an initial resolution of 4K (i.e., a resolution of 4096×2160) is converted. There are two ways of converting a 4K source into an 8K source, one is to stretch a 4K image/video directly into a 8K image/video by image stretching (e.g., by mapping or copying each of 4096×2160 pixels into four of 7680× 4320 pixels), and the other is to algorithmically convert (or, upscale) a 4K image/video into a 8K image/video.

At present, an 8K display device can convert a 4K source into an 8K source only by means of image stretching, and display the 8K source. However, the definition of the 8K source obtained by image stretching is low, and it cannot meet the requirement for a user's viewing experience. Currently, to algorithmically convert a 4K source into an 8K source, an additional Personal Computer (PC) or another external device is required to convert the 4K source into the 8K source and play the 8K source. However, the PC or another external device is an individual device separated from the 8K display device, and the user needs to purchase both the 8K display device and the personal computer or another external device and connect the PC or another external device to the 8K display device. It is complicated to connect the 8K display device with the PC or another external device, so professional guidance is required and is inconvenient for a user to install them by himself/herself. Moreover, when a user uses a PC or another external device to convert an image/video source into an 8K source, the user needs to separately operate an 8K display device, the PC or another external device, and an 8K video player installed in the PC or another external device, which is complicated in operation and affects the user experience.

Referring to FIG. 1, an embodiment of the present disclosure provides a display device 100, including: a controller 10, a display processor 20, a resolution converter 30 and a display screen 40. The controller 10, the display processor 20, the resolution converter 30, and the display screen 40 are integrated as a whole. In other words, the controller 10, the display processor 20, and the resolution converter 30 are all components embedded in the display device 100, so that it is not necessary for a user to connect the resolution converter 30 and the display processor 20 to the display screen 40, simplifying the mounting process of the user.

For example, the controller 10 may be an SOC (System on Chip), the display processor 20 may be a display processing chip such as a scaler chip, the resolution converter 30 may be a 4K-to-8K board card or a PC board card, which is mainly used as a carrier for a 4K-to-8K algorithm, and the display screen 40 may be an 8K display screen capable of displaying an image with an 8K resolution.

The controller 10 is configured to generate, in response to a user's first request of setting a current signal source type to a first signal source type, a first control signal corresponding to the first request, and transmit the first control signal. The first signal source type indicates a type of a signal source for providing display data having a target resolution and a first definition. In other words, when the user requests to set the current signal source type to the first signal source type, the user is intended to see the display data having the target resolution and the first definition on the display screen.

In some embodiments, setting the current signal source type to the first signal source type may refer to switching the current signal source type to the first signal source type.

Exemplarily, in a case where the current signal source type is not the first signal source type and the first request of setting the current signal source type to the first signal source type is received, a first control signal for causing the display device 100 to display the display data having the target resolution and the first definition may be generated by the controller 10. The display data may be an 8K-resolution image or video with the first definition obtained by the resolution converter 30.

The display processor 20 is coupled to the controller 10, and is configured to receive the first control signal from the controller 10 and to forward the first control signal. The resolution converter 30 is coupled to the display processor 20, and is configured to receive initial display data having an initial resolution, receive the first control signal from the display processor 20, convert the initial display data into first display data having the target resolution and the first definition in response to the first control signal, and transmit the first display data to the display processor. The target resolution is greater than the initial resolution, and the first definition is greater than a second definition that is a definition of display data obtained by performing image stretching on the initial display data and having the target resolution.

The first control signal transmitted from the controller 10 is transmitted to the resolution converter 30 via the display processor 20, and the resolution converter 30 converts the initial display data having the initial resolution into the first display data having the target resolution under the control of the first control signal and transmits the first display data to the display processor 20. The resolution converter 30 is not directly coupled to the controller 10, but both the resolution converter 30 and the controller 10 need to be coupled to the display processor 20, and thus the first control signal is forwarded from the controller 10 to the resolution converter 30 through the display processor 20. That is, the user may switch the current signal source type to the first signal source type through the controller 10, such that the display screen displays the high-definition image/video obtained from the resolution converter 30, without operating the controller 10 and the resolution converter 30 separately. Thus, the operation of a user can be simplified, and the user experience can be improved.

Exemplarily, the initial resolution may be a 4K resolution, and the target resolution is an 8K resolution, that is, the resolution converter 30 upscales the initial display data with a resolution of 4K into the first display data with a resolution of 8K by an algorithm such as interpolation, super-resolution, etc. The algorithmic conversion may provide higher definition than stretching a 4K-resolution display data to an 8K-resolution display data.

In some embodiments, the resolution converter 30 may further include a player function to perform a playback processing on the obtained first display data and transmit the first display data subjected to the playback processing to the display processor for displaying on the display screen. For example, the first display data may be subjected to codec, control, and other operations related to playback by the resolution converter 30.

The display processor 20 is further configured to receive the first display data from the resolution converter 30, process the first display data, and transmit the processed first display data. The display screen 40 is coupled to the display processor 20 and is configured to receive the first display data from the display processor 20 and display the first display data having the target resolution with the first definition.

Exemplarily, the display processor 20 processes the received first display data into RGB data that can be recognized and displayed by the display screen 40, performs compensation and correction on the RGB data, and then transmits the RGB data to the display screen 40 for display by the display screen 40.

In some embodiments, referring to FIG. 1, the display processor 20 includes a first communication control interface 21, the first communication control interface 21 is coupled to the controller 10 and the resolution converter 30, and the display processor 20 receives the first control signal from the controller 10 and forwards the first control signal to the resolution converter 30 via the first communication control interface 21. The resolution converter 30 includes a second communication control interface 31, the second communication control interface 31 is coupled to the first communication control interface 21, and the resolution converter 30 receives the first control signal from the display processor 20 via the second communication control interface 31.

Exemplarily, the first communication control interface 21 and the second communication control interface 31 may be communication interfaces such as a display data channel command interface (DDCCI) or a serial interface, which is not limited herein.

In some embodiments, the resolution converter 30 includes a first display data output interface 32, and the resolution converter 30 transmits the first display data to the display processor 20 via the first display data output interface 32. The display processor 20 includes a first display data input interface 22, the first display data input interface 22 is coupled to the first display data output interface 32, and the display processor 20 receives the first display data from the resolution converter 30 via the first display data input interface 22. The first display data converted by the resolution converter 30 is transmitted to the first display data input interface 22 of the display processor 20 through the first display data output interface 32 of the resolution converter 30.

In some embodiments, the first communication control interface 21 and the first display data input interface 22 are integrated into a high definition multimedia interface (HDMI). In some embodiments, the second communication control interface 31 and the first display data output interface 32 are integrated into a HDMI. The integration of the first communication control interface 21 and the first display data input interface 22, and the integration of the second communication control interface 31 and the first display data output interface 32 can simplify the wiring operation and facilitate the assembly. In addition, the existing HDMI interface and protocol can be utilized for data transmission, and no additional interface is needed.

Exemplarily, communication signals are transmitted between the first communication control interface 21 and the second communication control interface 31 under the DDCCI protocol, such that an inter-integrated circuit (I2C) channel in the HDMI interface may be reused by the first communication control interface 21 and the second communication control interface 31.

Exemplarily, the first communication control interface 21 and the first display data input interface 22 may be integrated into one HDMI2.1 interface, or integrated into four HDMI2.0 interfaces; correspondingly, the second communication control interface 31 and the first display data output interface 32 may also be integrated into one HDMI2.1 interface, or integrated into four HDMI2.0 interfaces.

Figure 2:
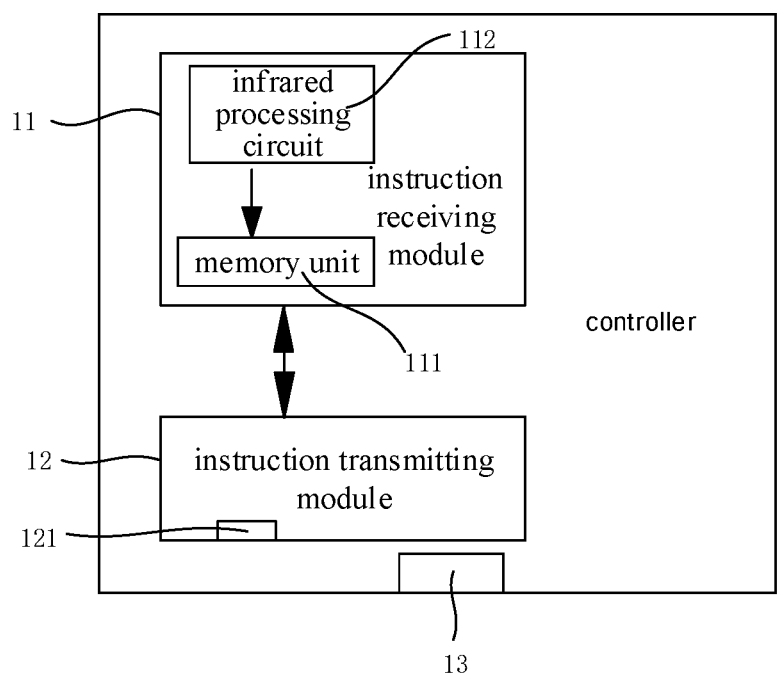
FIG. 2 is a block diagram of a controller according to an embodiment of the disclosure.

In some embodiments, referring to FIG. 2, the controller 10 includes an instruction receiving module 11 and an instruction transmitting module 12. The instruction receiving module 11 is configured to generate a control signal corresponding to at least one request from a user in response to the at least one request and transmit the control signal, the at least one request may include the first request, and the control signal may include the first control signal. The instruction transmitting module 12 is coupled to the instruction receiving module 11 and the first communication control interface 21, and configured to receive the control signal from the instruction receiving module 11 and transmit the control signal to the first communication control interface 21. The transmission of control signals between the instruction receiving module 11 and the instruction transmitting module 12 are realized through an internal program of the controller 10. The instruction receiving module 11 and the instruction transmitting module 12 may be implemented as software modules, hardware modules, firmware modules, etc. in a processing chip such as an SOC.

In some embodiments, the controller 10 further includes a control signal transmission interface 121. The instruction transmitting module 12 is coupled to the first communication control interface 21 through the control signal transmission interface 121.

In the case where the first communication control interface 21 and the second communication control interface 31 are I2C interfaces, the control signal transmission interface 121 may also be an I2C interface, so that the control signal transmission interface 121 can be communicatively connected with the first communication control interface 21. In this case, the control signals all follow the DD CI protocol.

Referring to FIG. 2, the instruction receiving module 11 includes a memory unit 111 and an infrared processing circuit 112. The memory unit 111 is configured to store mapping relationships of a plurality of keys of a remote controller 50 and key values. The memory unit 111 may be implemented as a memory, a storage, or other types of storage space in a processing chip such as an SOC.

For example, TABLE 1 indicates a mapping relationship between a plurality of keys of a remote controller and key values stored in the memory unit 111. It should be understood that TABLE 1 is only an exemplary list of some mapping relationships but not all mapping relationships, and other mapping relationships may also be included in the memory unit 111, which are not listed here.

TABLE 1

| key of a remote controller | key value |
| --- | --- |
| Up Key | 0x80 |
| Down Key | 0x81 |
| Left Key | 0x82 |
| Right Key | 0x83 |
| Return Key | 0x84 |
| Confirm Key | 0x85 |
| Menu Key | 0x86 |
| Volumn + Key | 0x87 |
| Volumn − Key | 0x88 |
| Power-on Key | 0x89 |

The infrared processing circuit 112 is configured to receive a signal emitted by the remote controller when a user presses a key of the remote controller, query the mapping relationship in the memory unit according to the received signal to determine a key value of the key pressed by the user, and generate a control signal according to the determined key value.

Exemplarily, when the current signal source type is switched to the first signal source type, the controller 10 transmits the received remote control key value to the display processor 20, and the display processor 20 generates a first control signal, which is encoded according to the protocol shown in TABLE 3 below and carries a remote control key value corresponding to a key of the remote controller. The first control signal is then transmitted to the resolution converter 30, and the resolution converter 30 performs a corresponding operation according to the key value of the key. The display processor 20 includes a DDCCI control module. The remote control key values are transmitted to and encoded by the DDCCI control module, and then transmitted to the resolution converter 30 via the first communication control interface 21 of the display processor 20.

When the display processor 20 and the resolution converter 30 interact with each other for control signals, the resolution converter 30 may be used as a master device, and the display processor 20 may be used as a slave device. Referring to TABLE 2, the resolution converter 30 first sends an instruction for obtaining a control signal to the display processor 20; then, referring to TABLE 3, the display processor 20 transmits the encoded control signal to the resolution converter 30.

TABLE 2

Master −> Slave

| Command format | | | Length | Command | Data [0] | ... | Data [n] | Check-sum |
| --- | --- | --- | --- | --- | --- | --- | --- | --- |
| | 6E | 51 | | | | | | |
| Value | 6E | 51 | 82 | F5 | 05 | | | Check byte |

TABLE 3

Slave −> Master

| Command format | | | Length | Command | Data [0] | ... | Data [n] | Check-sum |
| --- | --- | --- | --- | --- | --- | --- | --- | --- |
| | 6E | 6E | | | | | | |
| Value | 6E | 6E | 82 | F6 | key value | | | Check byte |

It should be noted that, in some other embodiments, the display processor 20 may also be used as a master device, the resolution converter 30 may be used as a slave device, and after receiving the remote key value sent by the controller 10, the DDCCI control module of the display processor 20 performs encoding in a manner shown in TABLE 3 to generate a control signal, and then directly sends the control signal to the resolution converter 30.

Figure 3A:
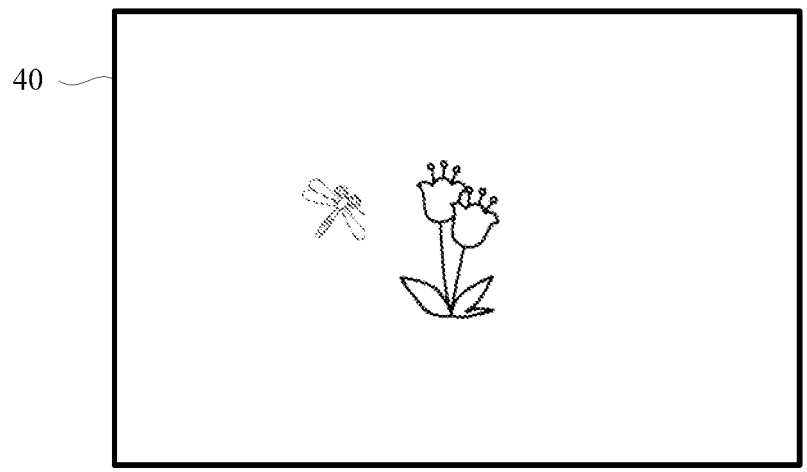
FIG. 3A is a diagram illustrating a display screen according to an embodiment of the disclosure when displaying an image.
Figure 3B:
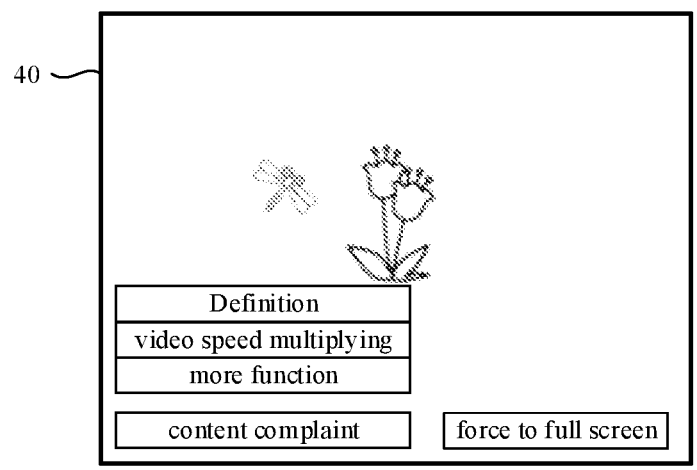
FIG. 3B is a diagram illustrating a display screen according to an embodiment of the disclosure when displaying menu options.

For example, referring to FIG. 3A, when the remote controller is not operated, the display screen displays the first display data. When the user presses the "menu key" button of the remote controller, a screen shown in FIG. 3B pops up, and "menu options" are displayed at a partial position of the display screen 40. It is shown in FIG. 3B as an example that the "menu options" are at the lower left corner of the display screen 40, and it can be understood that the "menu options" may also be located in the middle, the upper left corner, the upper right corner, and the like of the display screen 40, which is not limited herein. The "menu options" may include information such as "definition", "video speed multiplying", and "more functions", which is not limited herein.

In some embodiments, the controller 10 is further configured to, in response to a second request of setting the current signal source type to a second signal source type, generate a second control signal corresponding to the second request, acquire initial display data having the initial resolution, and transmit the second control signal and the initial display data to the display processor 20. The display processor 20 is further configured to receive the initial display data from the controller 10, and perform an image stretching processing on the initial display data to obtain and transmit second display data having the target resolution. The display screen 40 is further configured to receive the second display data from the display processor 20 and display the second display data having the target resolution with the second definition. The second signal source type indicates a type of a signal source for providing display data having the target resolution and the second definition, and the second definition is smaller than the first definition.

Exemplarily, in a case where the current signal source type is not the second signal source type and a request of setting the current signal source type to the second signal source type is received, a control signal for causing the display device 10 to display the display data having the target resolution and the second definition may be generated by the controller 10. For example, the initial resolution is 4K, the controller 10 included in the display device 100 may acquire and play a 4K video source, and the display processor 20 may stretch the initial display data of 4K resolution into the second display data of 8K resolution. The second signal source type may be a type of a signal source for providing an 8K-resolution image or video of the second definition, which is obtained by stretching a 4K-resolution image or video by the display processor.

The first display data and the second display data have the same resolution of 8K, but the first definition of the first display data converted by the resolution converter 30 is greater than the second definition of the second display data obtained by the display processor through stretching. The user may control the display screen 40 to display the first display data or display the second display data through the controller 10.

In some embodiments, the controller 10 includes an initial display data output interface 13 and the display processor 20 includes an initial display data input interface 23. The initial display data output interface 13 is coupled to the initial display data input interface 23, and the controller 10 transmits the initial display data to the display processor 20 through the initial display data output interface 13 and the initial display data input interface 23.

The display device 100 further includes a remote controller 50. The remote controller 50 is configured to generate and transmit a transmission signal corresponding to a pressed key in response to an operation of the user pressing the key of the remote controller 50. The user may control, through the remote controller 50, the display screen to display the first display data or the second display data, thereby simplifying the operation process of the user and improving the user experience.

Figure 4:
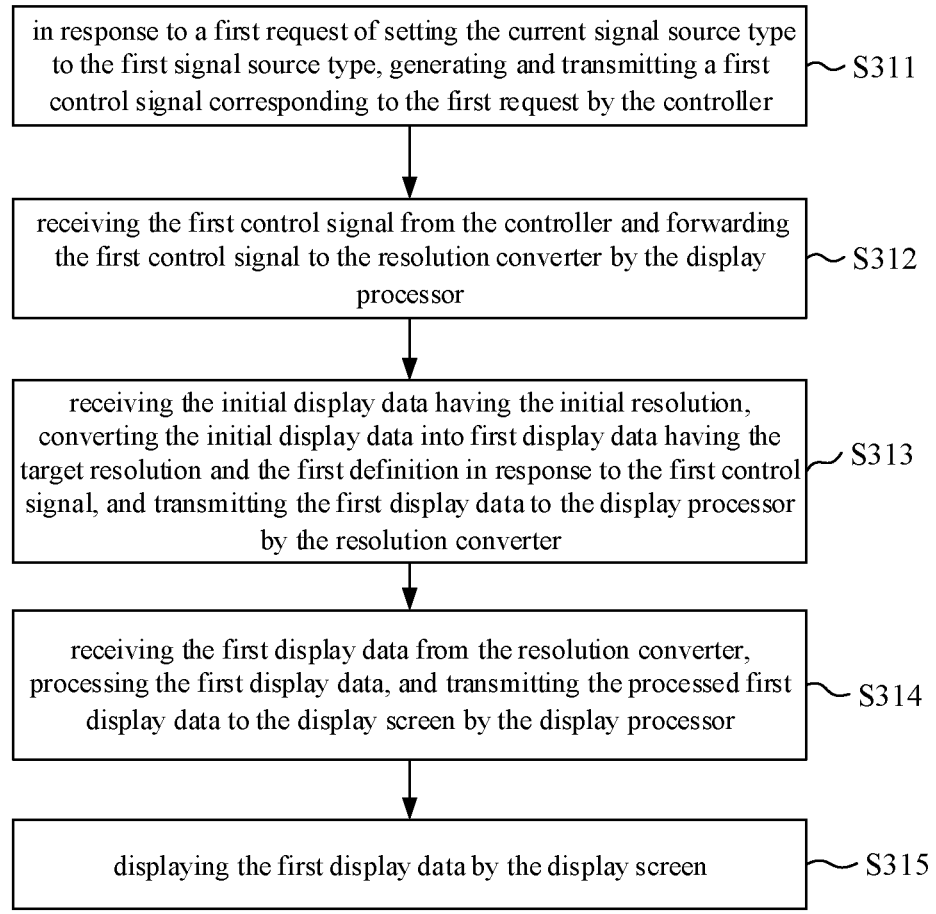
FIG. 4 is a flowchart of a control method of a display device according to an embodiment of the disclosure.

An embodiment of the present disclosure further provides a control method of a display device for controlling the display device 100 according to any embodiment as described above, where the display device 100 includes a controller 10, a display processor 20, a resolution converter 30, and a display screen 40. Referring to FIG. 4, the control method includes steps S311 to S315.

In step S311, the controller 10 generates and transmits a first control signal corresponding to a first request of setting the current signal source type to the first signal source type, in response to the first request.

Exemplarily, in a case where the current signal source type is not the first signal source type, the user issues a request to switch to the first signal source by operating the remote controller 50. The remote controller 50 sends out a corresponding infrared signal; the infrared processing circuit 112 of the instruction receiving module 11 included in the controller 10 receives the infrared signal, query the mapping relationship stored in the memory unit 111, and determines the key value of the key pressed by the user according to the received signal and the mapping relationship; and the infrared processing circuit 112 generates the first control signal according to the determined key value, and transmits the first control signal to the instruction transmitting module 12; and then, the instruction transmitting module 12 transmits the first control signal through the control signal transmission interface 121.

In step S312, the display processor 20 receives the first control signal from the controller 10 and forwards the first control signal to the resolution converter 30.

Exemplarily, the first communication control interface 21 of the display processor 20 is coupled to the control signal transmission interface 121. The display processor 20 receives the first control signal transmitted from the control signal transmission interface 121 via the first communication control interface 21 and transmits the first control signal to the second communication control interface 31 coupled to the first communication control interface 21.

In step S313, the resolution converter 30 receives the initial display data having the initial resolution, converts the initial display data into first display data having the target resolution and the first definition in response to the first control signal, and transmits the first display data to the display processor 20.

In some embodiments, the resolution converter 30 may not only convert the initial display data into the first display data having the target resolution, but also have a player function for playing the obtained first display data. In other words, the resolution converter 30 may perform a playback processing on the first display data and transmit the first display data subjected to the playback processing to the display processor 20.

In step S314, the display processor 20 receives the first display data from the resolution converter 30, processes the first display data, and transmits the processed first display data to the display screen 40.

In step S315, the display screen 40 displays the first display data with the first definition and the target resolution.

Figure 5:
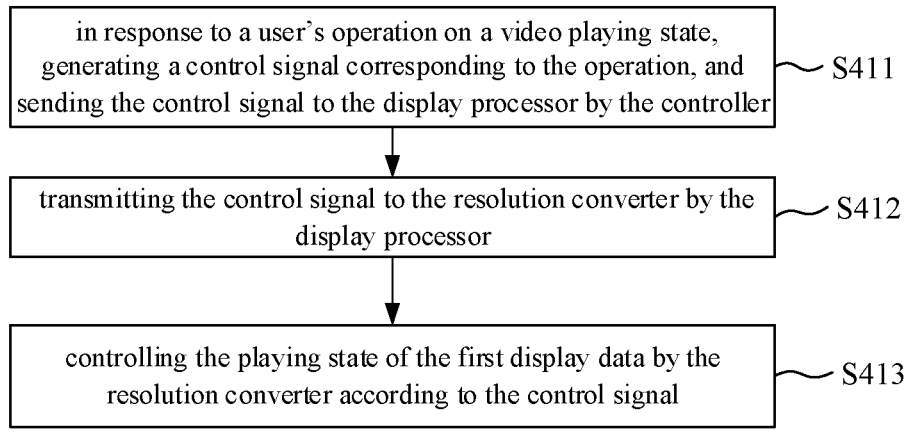
FIG. 5 is a flowchart illustrating another control method of a display device according to an embodiment of the disclosure.

In some embodiments, referring to FIG. 5, in the case where the current signal source is the first signal source, the control method further includes steps S411 to S413.

In step S411, in response to a user's operation on a video playing state, the controller 10 generates a control signal corresponding to the operation, and sends the control signal to the display processor 20.

Exemplarily, the user's operation on the video playing state may be selecting a file, opening a file, playing a file, pausing a file, selecting a playing speed, or the like, which are not described in detail herein. Each operation corresponds to a different control signal so that the resolution converter 30 can respond correspondingly according to different control signals.

In step S412, the display processor 20 transmits the control signal to the resolution converter 30.

In step S413, the resolution converter 30 controls the playing state of the first display data according to the control signal.

The player for the first signal source is embedded in the resolution converter 30. In the case where the current signal source type is the first signal source type, a control signal for the video playing state is transmitted to the resolution converter 30 through the controller 10 and the display processor 20, thereby controlling the playing state of the first display data. The user can not only switch the signal source to the first signal source through the remote controller 50, but also adjust the playing state of the first display data through the remote controller under the condition that the first signal source is displayed on the display screen 40, and thus the user operation is simple.

Exemplarily, the user presses a pause key (pause playing a file) through the remote controller 50 and sends out a corresponding infrared signal. The infrared processing circuit 112 of the instruction receiving module 11 receives the infrared signal, queries the mapping relationship stored in the memory unit 111, and determines the key value of the key pressed by the user according to the received signal and the mapping relationship; and the infrared processing circuit 112 generates a control signal according to the determined key value, and transmits the control signal to the instruction transmitting module 12. The instruction transmitting module 12 transmits the control signal to the first communication control interface 21 through the control signal transmission interface 121; then the control signal is transmitted to the second communication control interface 31 via the first communication control interface 21 to control the player included in the resolution converter 30 to control the playing state of the first display data.

Figure 6:
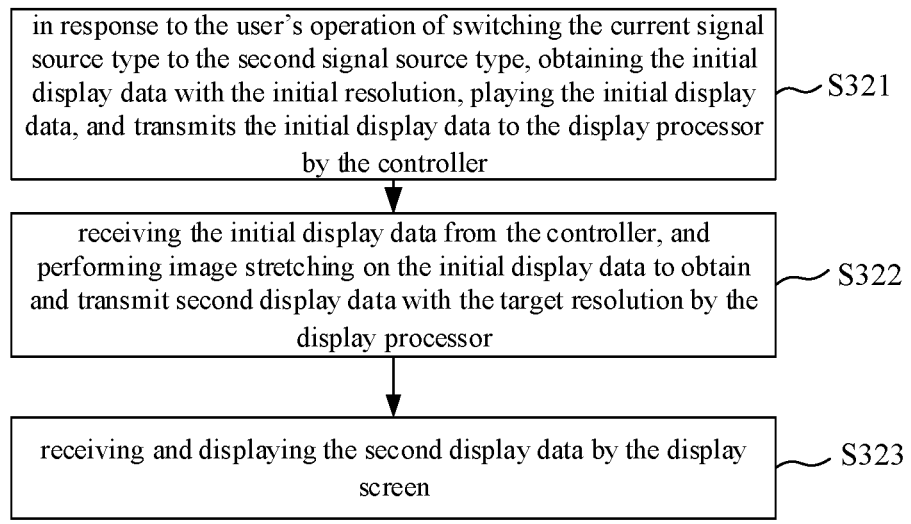
FIG. 6 is a flowchart illustrating another control method of a display device according to an embodiment of the disclosure.

In some embodiments, referring to FIG. 6, the control method further includes steps S321 to S323.

In step S321, in response to the user's operation of switching the current signal source type to the second signal source type, the controller 10 obtains the initial display data with the initial resolution, plays the initial display data, and transmits the initial display data to the display processor 20. The player of the second signal source is embedded in the controller 10.

Exemplarily, a user switches the current signal source type from the first signal source type to the second signal source type. The remote controller 50 sends out a corresponding infrared signal; the infrared processing circuit 112 of the instruction receiving module 11 included in the controller 10 receives the infrared signal, queries the mapping relationship stored in the memory unit 111, and determines the key value of the key pressed by the user according to the received signal and the mapping relationship; and the infrared processing circuit 112 generates a corresponding control signal according to the determined key value. Under the control of the control signal, the controller 10 acquires the initial display data with the initial resolution, plays the initial display data, and sends the initial display data to the display processor 20 through the initial display data output interface 13.

In step S322, the display processor 20 receives the initial display data from the controller 10, and performs image stretching on the initial display data to obtain and transmit second display data with the target resolution.

Exemplarily, the initial display data input interface 23 included in the display processor 20 receives the initial display data from the initial display data output interface 13, and the display processor 20 stretches the initial display data to obtain the second display data with the target resolution, and transmits the second display data to the display screen 40.

In step S323, the display screen 40 receives and displays the second display data.

In some embodiments, in the case where the current signal source type is the second signal source type, the control method further includes a step S421.

In step S421, the controller 10 controls the playing state of the initial display data in response to the user's operation on the video playing state.

The player of the first signal source is embedded in the controller 10, and the controller 10 generates a corresponding control signal in response to an operation of a user on the video playing state, so as to control the playing state of the initial display data.

Figure 7:
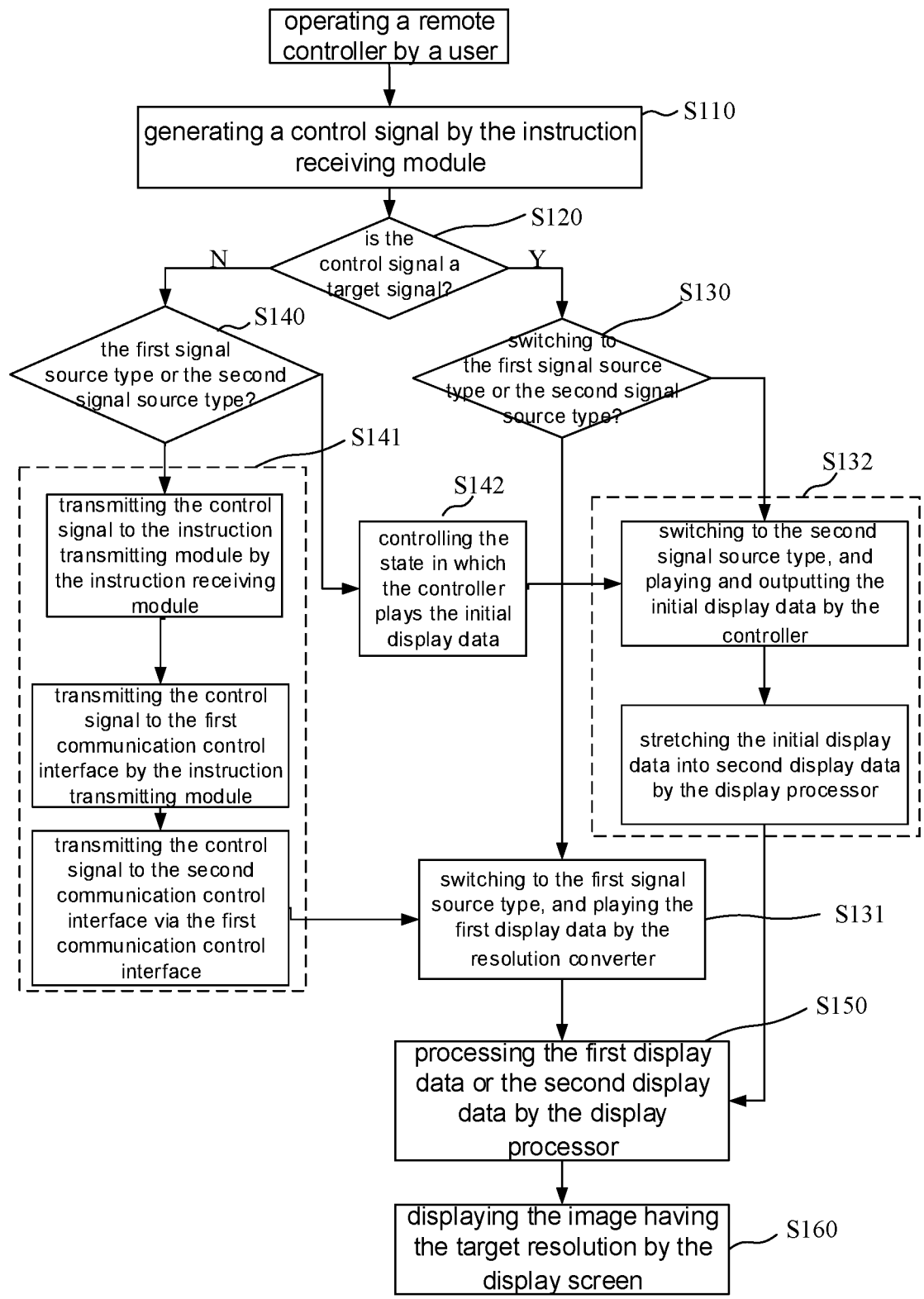
FIG. 7 is a flowchart illustrating still another control method of a display device according to an embodiment of the disclosure.

FIG. 7 illustrates another example of a control method of a display device according to an embodiment of the present disclosure. In some embodiments, referring to FIG. 7, the control method may include steps S110 to S160.

In step S110, the instruction receiving module 11 of the controller 10 generates a control signal in response to a user's operation or request.

In step S120, it is judged whether the control signal is a target signal or not.

The target signal is a control signal for switching the current signal source type, and includes a first control signal for switching the current signal source type to the first signal source type and a control signal for switching the current signal source type to the second signal source type.

In step S130, in a case where the control signal is the target signal, it is judged whether the target signal is used for switching the current signal source type to the first signal source type or the second signal source type.

In a case where the target signal is determined to be used for switching the current signal source type to the first signal source type, it proceeds to step S131, in which the resolution converter 30 plays the first display data.

Switching the current signal source type to the first signal source type means that, the controller 10, in response to a request of switching the current signal source type to the first signal source type, generates and transmits a first control signal corresponding to the request (S311), and then the resolution converter 30 receives the initial display data, converts the initial display data into first display data having the target resolution in response to the first control signal, and plays the first display data (S313).

In a case where it is determined that the target signal is used for switching the current signal source type to the second signal source type, it proceeds to step S132, in which the controller 10 outputs initial display data.

Switching the current signal source type to the second signal source type means that the controller 10 acquires the initial display data having the initial resolution in response to a request of switching the current signal source type to the second signal source type, and transmits the initial display data to the display processor 20 (S321), and the display processor 20 stretches the initial display data into second display data (S322).

In step S140, if the control signal is not the target signal, it is judged whether the current signal source type is the first signal source type or the second signal source type.

If the current signal source type is the first signal source type, it proceeds to step S141, in which the control signal is transmitted by the instruction receiving module 11 to the instruction transmitting module 12, then transmitted by the instruction transmitting module 12 to the first communication control interface 21, and then transmitted to the second communication control interface 31 via the first communication control interface 21, so as to control the state in which the resolution converter plays the first display data.

The case where the current signal source type is the first signal source type and the control signal is not the target signal for switching the current signal source means that, the controller 10 generates a control signal corresponding to a user's operation on the video playing state in response to the operation, then transmits the control signal to the display processor 20 (S411), and then the display processor 20 transmits the control signal to the resolution converter 30 (S412), and the resolution converter 30 controls the playing state of the first display data according to the control signal (S413).

In step S142, if the current signal source type is the second signal source type, the control signal controls, through the control signal processing module of the controller 10, the state in which the controller 10 plays the initial display data.

The case where the current signal source type is the second signal source type and the control signal is not the target signal for switching the current signal source means that, the controller 10 controls the playing state of the initial display data in response to the user's operation on the video playing state (S421).

In step S150, the display processor 20 processes the first display data or the second display data.

The first display data obtained by the resolution converter 30 and the second display data obtained by the display processor through stretching are both required to be further processed by the display processor 20 (for example, further processed into RGB data). The processing of the first display data or the second display data by the display processor 20 includes: in the case where the current signal source type is the first signal source type, the display processor 20 receives the first display data from the resolution converter 30, and processes the first display data; and, in the case where the current signal source type is the second signal source type, the display processor 20 further processes the second display data obtained by the display processor 20 through stretching.

In step S160, the display screen 40 displays the image having the target resolution.

The step of displaying an image having a target resolution by the display screen 40 includes: displaying the first display data by the display screen 40 under the first signal source type (S315), and displaying the second display data by the display screen 40 under the second signal source type (S323).

It can be understood that the foregoing embodiments are merely exemplary embodiments used for describing the principle of the disclosure, but the disclosure is not limited thereto. Those of ordinary skill in the art may make various variations and improvements without departing from the spirit and essence of the present invention, and these variations and improvements shall also fall into the protection scope of the disclosure.

What is claimed is:

1. A display device, comprising:
   a controller configured to generate, in response to a first request of setting a current signal source type to a first signal source type, a first control signal corresponding to the first request, and transmit the first control signal, the first signal source type indicating a type of a signal source for providing display data having a target resolution and a first definition;
   a display processor coupled to the controller, and configured to receive the first control signal from the controller and to forward the first control signal;
   a resolution converter coupled to the display processor, and configured to receive initial display data having an initial resolution, receive the first control signal from the display processor, convert the initial display data into first display data having the target resolution and the first definition in response to the first control signal, and transmit the first display data to the display processor, the target resolution being greater than the initial resolution, and the first definition being greater than a second definition that is a definition of display data having the target resolution and obtained by performing image stretching on the initial display data; and
   a display screen coupled to the display processor and configured to display display data from the display processor,
   wherein the display processor is further configured to receive the first display data from the resolution converter, process the first display data, and transmit the first display data subjected to processing to the display screen, and the display screen is configured to receive the first display data from the display processor and display the first display data having the target resolution with the first definition, and
   the controller, the display processor and the resolution converter are embedded in the display device,
   wherein the controller is further configured to: acquire the initial display data with the initial resolution, generate, in response to a second request of setting the current signal source type to a second signal source type, a second control signal corresponding to the second request, and transmit the second control signal and the initial display data to the display processor, the second signal source type indicating a type of a signal source for providing display data having the target resolution and the second definition,
   the display processor is further configured to receive the initial display data from the controller, and perform image stretching on the initial display data to obtain and transmit second display data having the target resolution and the second definition, and
   the display screen is further configured to receive the second display data from the display processor and display the second display data having the target resolution with the second definition.

2. The display device of claim 1, wherein
   the display processor comprises a first communication control interface via which the display processor receives the first control signal from the controller and forwards the first control signal to the resolution converter, and
   the resolution converter comprises a second communication control interface coupled to the first communication control interface, the resolution converter receiving the first control signal from the display processor via the second communication control interface.

3. The display device of claim 2, wherein
   the resolution converter comprises a first display data output interface via which the resolution converter transmits the first display data to the display processor, and
   the display processor comprises a first display data input interface coupled to the first display data output interface, the display processor receiving the first display data from the resolution converter via the first display data input interface.

4. The display device of claim 3, wherein the first communication control interface and the first display data input interface are integrated into a high-definition multimedia interface (HDMI).

5. The display device of claim 3, wherein the second communication control interface and the first display data output interface are integrated into an HDMI.

6. The display device of claim 2, wherein the controller comprises:
   an instruction receiving module configured to generate, in response to at least one request from a user, a control signal corresponding to the at least one request, and transmit the control signal, the at least one request comprising the first request, and
   an instruction transmitting module coupled to the instruction receiving module and the first communication control interface, and configured to receive the control signal from the instruction receiving module and transmit the control signal to the first communication control interface.

7. The display device of claim 6, wherein the controller further comprises:
   a control signal transmission interface, through which the instruction transmitting module is coupled to the first communication control interface.

8. The display device of claim 7, wherein the control signal interface is an inter-integrated circuit (I2C) interface.

9. The display device of claim 6, wherein the instruction receiving module comprises:
a memory unit configured to store a mapping relationship between a plurality of keys of a remote controller and key values, and
an infrared processing circuit configured to receive a signal emitted by the remote controller when a user presses a key of the remote controller, query the mapping relationship in the memory unit according to the received signal to determine a key value of the key pressed by the user, and generate a control signal according to the determined key value.

10. The display device of claim 1, wherein the resolution converter is further configured to perform a playback processing on the first display data, and to transmit the first display data subjected to the playback processing to the display processor.

11. The display device of claim 10, wherein
the controller comprises an initial display data output interface via which the controller transmits the initial display data to the display processor, and
the display processor comprises an initial display data input interface coupled to the initial display data output interface, the display processor receiving the initial display data from the controller via the initial display data input interface.

12. A control method of a display device, the display device comprising a controller, a display processor, a resolution converter and a display screen, the control method comprising:
generating, by the controller and in response to a first request of setting a current signal source type to a first signal source type, a first control signal corresponding to the first request, and transmitting, by the controller, the first control signal, the first signal source type indicating a type of a signal source for providing display data having a target resolution and a first definition;
receiving, by the display processor, the first control signal from the controller and forwarding, by the display processor, the first control signal to the resolution converter;
receiving, by the resolution converter, initial display data having an initial resolution, converting, by the resolution converter and in response to the first control signal, the initial display data into first display data having the target resolution and the first definition, and transmitting, by the resolution converter, the first display data to the display processor, the target resolution being greater than the initial resolution, and the first definition being greater than a second definition that is a definition of display data obtained by performing image stretching on the initial display data and having the target resolution;
receiving, by the display processor, the first display data from the resolution converter, processing, by the display processor, the first display data, and transmitting, by the display processor, the first display data subjected to processing to the display screen; and
displaying, by the display screen, the first display data with the target resolution and the first definition,
wherein the control method further comprises in response to the current signal source type being the first signal source type,
generating by the controller and in response to a user's operation on a video playing state, a control signal corresponding to the operation, and transmitting, by the controller, the control signal to the display processor;
transmitting, by the display processor, the control signal to the resolution converter; and
controlling, by the resolution converter, a playing state of the first display data according to the control signal.

13. The control method of claim 12, further comprising:
performing, by the resolution converter, a playback processing on the first display data and transmitting, by the resolution converter, the first display data subjected to the playback processing to the display processor.

14. The control method of claim 12, further comprising:
acquiring, by the controller, the initial display data with the initial resolution;
generating, by the controller and in response to a second request of setting the current signal source type to a second signal source type, a second control signal corresponding to the second request, and transmitting, by the controller, the second control signal and the initial display data to the display processor, the second signal source type indicating a type of a signal source for providing display data having the target resolution and the second definition;
receiving, by the display processor, the initial display data from the controller, and performing, by the display processor, image stretching on the initial display data to obtain and transmit second display data with the target resolution and the second definition; and
displaying, by the display screen, the second display data.

15. The control method of claim 14, further comprising:
performing, by the resolution converter, a playback processing on the second display data and transmitting, by the resolution converter, the second display data subjected to the playback processing to the display processor.

16. The control method of claim 15, further comprising:
in response to the current signal source type being the second signal source type,
controlling, by the controller and in response to a user's operation on a video playing state, a playing state of the second display data.

* * * * *